United States Patent [19]

Chan et al.

[11] Patent Number: 4,556,972

[45] Date of Patent: Dec. 3, 1985

[54] ARRANGEMENT FOR ROUTING DATA PACKETS THROUGH A CIRCUIT SWITCH

[75] Inventors: Dominic K. Chan, Glen Ellyn; Kwok P. Lee, Naperville; Ronald B. Martin, Bolingbrook, all of Ill.

[73] Assignee: AT&T Bell Laboratories, Murray Hill, N.J.

[21] Appl. No.: 565,230

[22] Filed: Dec. 27, 1983

[51] Int. Cl.⁴ .......................... H04Q 11/04; H04J 3/16
[52] U.S. Cl. ....................................... 370/60; 370/89; 370/94; 370/95
[58] Field of Search ...................... 370/60, 94, 92, 95, 370/89

[56] References Cited

U.S. PATENT DOCUMENTS

| 3,342,945 | 9/1967 | Hopper et al. | 179/18 |
| 3,988,545 | 9/1976 | Kuemmerle et al. | 370/60 |
| 4,093,823 | 6/1978 | Chu | 370/92 |
| 4,154,983 | 5/1979 | Pedersen | 370/89 |
| 4,392,222 | 7/1983 | Ando | 370/60 |
| 4,484,326 | 11/1984 | Turner | 370/60 |
| 4,488,288 | 12/1984 | Turner | 370/60 |

FOREIGN PATENT DOCUMENTS 0108554 10/1983 European Pat. Off. .
57-7656 1/1982 Japan ................................... 370/60

OTHER PUBLICATIONS

Experimental Digital Data Switching System, Nakajo, 11/74.
Dalent Association Literature, Smet, Sanders, 6/76.
Roy D. Rosner, Packet Switching, Tomorrow's Communications Today, Lifetime Learning Publications, Belmont, California, 1982, p. 329.
"Control of Packet Switching Networks" by Dr. F. J. Ricci, NTC '77 Conference Record, pp. 46:5-1-46:5-4.
"Control of Military Circuit Switching Network in a Tactical Environment", by W. V. Tyrlick and J. Blackman, ISS '76, Kyoto, Japan, pp. 423-4-1 through 423-4-7.

Primary Examiner—Douglas W. Olms
Assistant Examiner—Curtis Kuntz
Attorney, Agent, or Firm—Richard J. Godlewski

[57] ABSTRACT

Disclosed is arrangement (101, 102, 110) for routing data packets designated for a particular destination (103) from a packet switch (114) through a circuit switch (120). The packet switch includes a plurality of output links (152, 153) connected to the circuit switch and a memory (209) for storing the identity of the output links designated for use to a particular destination. The circuit switch has a plurality of channels (190) to the particular destination and a switching network (121) for interconnecting an equal number of the channels and the designated output links. Included in the arrangement is a circuit allocator (110) that monitors the use of each of the designated links. When the overall use of the designated output links is greater than an upper threshold, the allocator causes the packet switch to increase the number of links designated for use to the particular destination and subsequently causes the circuit switch to correspondingly increase the number of channels interconnecting with the output links designated for use to the particular destination. The number of designated output links is similarly decreased when the designated overall use of the output links falls below a lower threshold. A predetermined algorithm is used to determine the upper and lower thresholds for each number of output links designated for use to the particular destination.

21 Claims, 9 Drawing Figures

ARRANGEMENT FOR ROUTING DATA PACKETS THROUGH A CIRCUIT SWITCH

TECHNICAL FIELD

This invention relates to communications systems and particularly to an arrangement for routing data packet traffic from a packet switch to a particular destination through a circuit switch.

BACKGROUND OF THE INVENTION

Historically, telecommunication customers have been selectively interconnected by the well-known public circuit-switched network on a one path per call basis. The circuit-switched network includes end office circuit switching systems, commonly referred to as end office circuit switches, that connect to the individual customers and the toll circuit-switched network that interconnects the various end offices. The toll circuit-switched network comprises a plurality of interconnected transit circuit switching system offices, commonly referred to as toll circuit switches. In response to a call from one customer to another, a single path is established through the circuit-switched network for the exclusive use of the two customers. When the two customers are served by the same end office circuit switching system, that system directly interconnects the customers. When the two customers are in different geographic areas, the end office circuit switching systems that serve the two the customers are interconnected through the toll circuit-switched network. In large population areas, end office circuit switching systems are also often directly interconnected to form local circuit-switched networks, thus avoiding the use of the toll circuit-switched network for local calls. However, the toll circuit-switched network still interconnects the various local circuit-switched networks for long distance calls.

In contrast, packet switching is based on the ability of packet switches to divide the call or, more particularly, a data message into pieces called data packets. Data packets move through a packet switching network from one customer to another via any number of different paths that interconnect the two customers. At the receiving customer, the data packets are assembled in the proper order to form the original message.

Because a data message is broken into similar data packets, the data packets designated for different destinations can move through a packet-switched network on the same facilities with a minimum of interference with each other. Thus, the facilities interconnecting the packet switches of a packet-switched network may be much more efficiently utilized than those of the circuit-switched network. However, most packet-switched networks have been developed to serve small geographic areas with a high density population of data customers. These local packet-switched networks have also typically been built to meet the needs of low volume users; but with the ever increasing numbers of small as well as large volume data users, the need for interconnecting the various local packet-switched networks to establish cross country internetwork communications is enormous. The problem is that the cost of establishing a toll packet-switched network or transmission facilities that connect the local packet-switched networks is equally, if not more, enormous than the need.

In a recent book by Roy D. Rosner, *Packet Switching, Tomorrow's Communication Today,* Lifetime Learning Publications, Belmont, Calif., 1982, it is suggested that a packet switch, acting as a user terminal, may be integrated with the circuit-switched network to share the transmission facilities of the circuit-switched network. However, the problem still remains of how a packet switch, not to mention a local packet-switched network, interfaces with the circuit-switched network to establish dedicated communication lines through the circuit-switched network. Furthermore, transmission facilities would have to be established between the packet switch and circuit-switched network for each packet switch destination.

SUMMARY OF THE INVENTION

The foregoing problems are solved and a technical advance is achieved by an arrangement for routing data packets from a packet switch through a circuit switch. The packet switch has a plurality of output links connected to the circuit switch and a routing memory for storing the identity of the output links designated for use to a particular destination. The circuit switch has a plurality of channels to the particular destination and a switching network for interconnecting the designated links with a number of the channels equal to the number of the output links designated for use to the particular destination. An allocator is responsive to data packets on the designated output links for causing the packet switch to change the number of output links designated for use to the particular destination when the overall use of the designated output links reaches a threshold.

In one illustrative embodiment of the invention, the circuit allocator comprises a monitor unit for determining the actual overall use of the designated output links. In particular, the monitor unit includes a link utilization circuit that is responsive to the busy/idle condition of each output link for determining the actual use thereof. A destination utilization circuit included in the monitor unit combines the actual use of each link designated for use to a particular destination to determine the actual overall use of the links designated for use to the particular destination. Also included in the circuit allocator is a control unit that compares the actual overall use of the links to a particular destination with an upper and a lower threshold that are unique for each number of output links designated for use to a particular destination. When the upper threshold is exceeded, an additional link designated for use to the particular destination is needed to carry the anticipated data packet traffic load, and the control unit accordingly signals the packet switch to increase the number of output links designated for use to the particular destination. Similarly, when the use falls below the lower threshold, the control unit signals the packet switch to decrease the number of output links designated for use to the particular destination.

In accordance with another feature of this invention, the allocator is responsive to the change in the identity of the output links designated for use to a particular destination for causing the circuit switch to change the number of channels interconnecting with the output links designated for use to the particular destination.

In accordance with still another feature of this invention, the allocator causes the packet switch to increase the number of output links designated for use to a particular destination when the actual overall use of the designated output links exceeds an upper threshold. In a like manner, the allocator causes the packet switch to decrease the number of output links designated for use to a particular destination when the actual overall use of the designated output links is less than a lower threshold.

In accordance with yet another feature of this invention, the upper and lower thresholds for each number of output links designated for use to a particular destination are determined using a predetermined algorithm.

BRIEF DESCRIPTION OF THE DRAWING

The invention may be better understood from the following detailed description when read with reference to the drawing in which.

DETAILED DESCRIPTION

Figure 1:
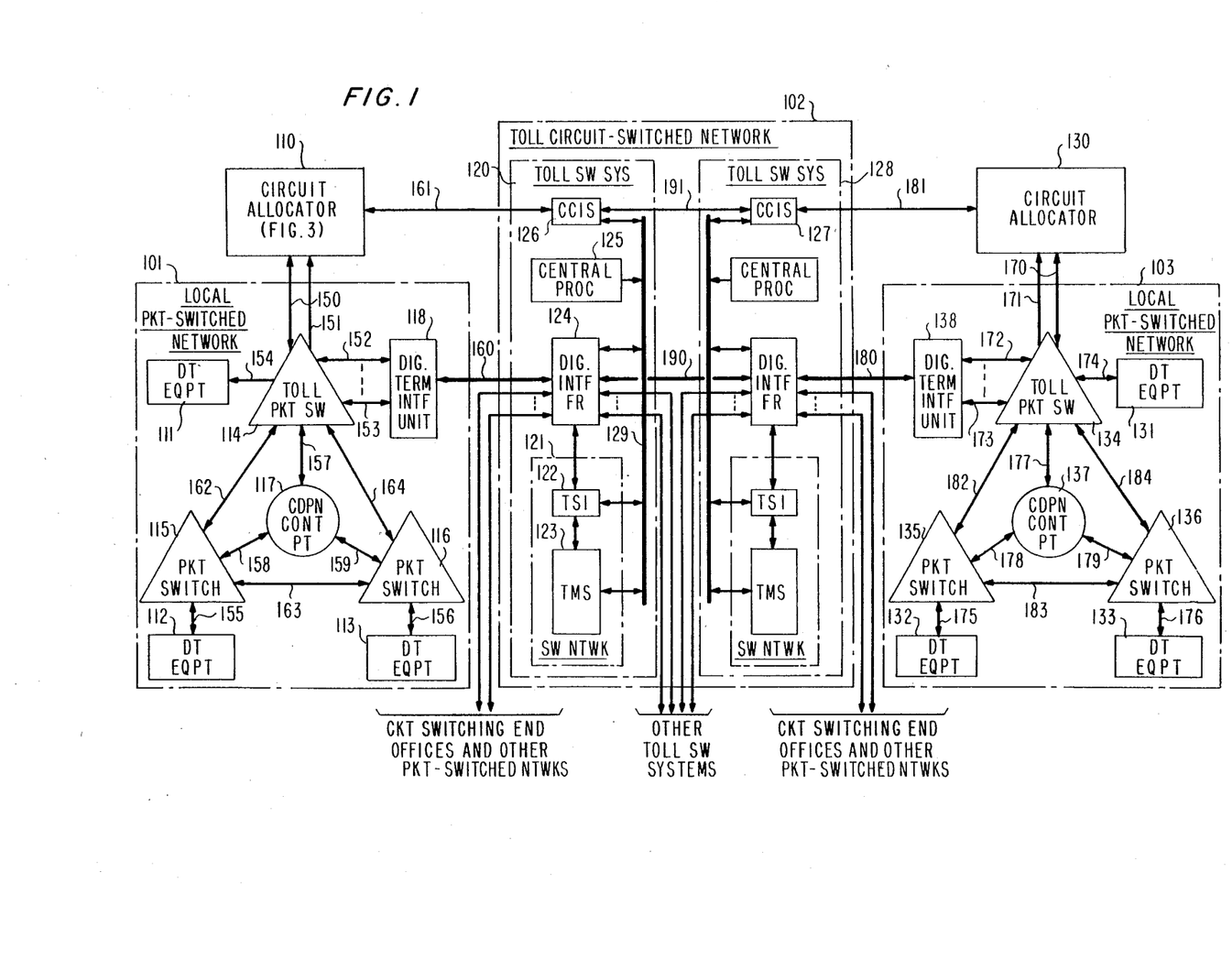
FIG. 1 shows a block diagram of an illustrative arrangement for routing data packet traffic from one local packet-switched network to another through the toll public circuit-switched network.

An illustrative arrangement for routing data packets that are designated for a particular destination such as local packet-switched network 103 from local packet-switched network 101 through toll circuit-switched network 102 is shown in the block diagram of FIG. 1. Interconnecting local packet-switched network 101 and toll circuit-switched network 102 is a fixed plurality of communications channels. These channels comprise a corresponding plurality of single channel data links such as 152 and 153 that digital multiplex terminal interface unit 118 interconnects with the multiplexed channels of digital carrier facility 160. Upon receipt of data packets designated for a particular destination, toll packet switch 114 designates one or more of these data links for exclusive use to the particular destination. The remaining data links are designated for exclusive use to the same or other destinations as additional data packet traffic is received. Toll circuit-switched network 102 includes a plurality of transit circuit switching systems such as 120 that interconnects the designated data links from the packet switch with channels from the circuit switch to the particular destination. The toll circuit-switched network, which is part of the well-known public switched telecommunications network, also serves a plurality of end office circuit switching systems that have not been shown to simplify the drawing. Circuit allocator 110 repetitively monitors the data packet traffic on the data links designated and causes packet switch 114 to change the number of designated data links for use to the particular destination. The circuit allocator also causes the circuit switch to correspondingly change the number of channels from the circuit switch to the particular destination that are connected to the designated data links from the packet switch.

The concept of dynamic allocation is very simple. It is the concentration of bursty traffic into a more continuous stream of information, monitoring this traffic stream, and allocating internetwork data links and transmission facilities to this concentrated stream. In this embodiment, the bursty traffic consists of internetwork data packets and is concentrated according to the particular geographic destination of the packets such as a particular local packet-switched network.

In terms of hierarchical networks, the packet-switched network may be viewed as being embedded in the present circuit-switched network. Each packet-switched network has a nominal connectivity pattern with other packet-switched networks through the circuit-switched network. When the traffic between any pair of packet-switched network begins to increase, the dynamic circuit allocator requests that the circuit switch allocate additional connectivity or capacity by connecting an available circuit through the circuit-switched network to the particular destination. Conversely, circuits are disconnected for use to other destinations when excess capacities are no longer needed.

Broadly, the arrangement is directed to the general problem of allocating resources among competing demands. In this instance, the competing demands in the toll circuit-switched network are data packets and voice messages. With respect to the internetwork data links that interconnect a packet-switched network and the circuit-switched network, the competing demands are between the data packets from the packet switch that are designated for different destinations. The resources are the data links that provide connectivity as well as capacity for the transmission of the data packets. An important characteristic of the problem at hand is that the acquisition time for connecting additional data links designated for use to a particular destination to channels to the destinations for the data packet traffic, which is measured in seconds, is one order of magnitude larger than the mean acceptable delay, which is measured in hundreds of milliseconds, required for this type of traffic. Thus, a predictive type of algorithm must be utilized to allocate capacity so that these resources are available to satisfy mean delay requirements. This algorithm must also be sensitive to the trend of the incoming traffic in order to react adequately to any changes. Yet, it must not be too sensitive to random fluctuations to avoid excessive oscillation.

Each of local packet-switched networks 101 and 103 each comprises a plurality of interconnected packet switching systems such as well-known packet switches 114–116 and 134–136 interconnected by data links 162–164 and 182–184, respectively. Also interconnecting all the switches within a packet-switched network is a centralized data packet network (CDPN) control point such as 117 in network 101 and 137 in network 103. Network control points 117 and 137 each exchanges traffic and load information between the switches of packet-switched networks 101 and 103 via data links 157–159 and 177–179, respectively. Each of these packet switches in turn serves a plurality of customer equipment such as well-known data terminal equipment 111–113 and 131–133 via data links 154–156 and 174–176, respectively. Typically, all of the aforementioned data links are either 56 or 64 Kb per second commercially available single channel data links utilizing an X.25 access protocol.

Generally, all the traffic into and out of a packet-switched network is directed through one of the packet switches in the network. The packet switch, referred to as a toll packet switch, connects to the toll circuit-switched network through a digital multiplex terminal interface unit such as 118 in network 101 and 138 in network 103. Digital multiplex terminal interface unit 118 multiplexes and demultiplexes data packets exchanged between the channels of digital carrier facility 160 and a plurality of parallel output data links such as 152 and 153. Connected to the circuit-switched network, digital carrier facility 160 may be any digital carrier system such as the well-known T-1 carrier that serially transmits either 56 or 64 Kb per second data from 24 data link channels such as 152 and 153 using a X.75 internetwork protocol. Likewise, digital multiplex terminal interface unit 138 interfaces the channels of digital carrier 180 and a plurality of internetwork data links such as 172 and 173 connected to toll packet switch 134. A typical digital multiplex terminal interface unit is described as part of the digital data system in *The Bell System Technical Journal,* Volume 54, Number 5, May-June, 1975, and need not be fully described herein for the reader to understand the present invention.

Toll circuit-switched network 102 comprises a plurality of toll offices such as well-known circuit switching systems 120 and 128 serving toll packet switches 114 and 134, respectively. A plurality of digital carrier facilities interconnect the toll offices of the circuit-switched network such as digital carrier facility 190 that interconnects circuit switching systems 120 and 128. The channels of digital carrier systems 160, 180, and 190 are selectively interconnected by circuit switching system 120 and 128 to form a plurality of point-to-point circuit connections between toll packet switches 114 and 134. Each point-to-point multiplex circuit connection also includes an internetwork data link from each of toll packet switches 114 and 134. The channels of digital carrier facilities 160 and 180 may also be selectively interconnected by respective circuit switching system 120 and 128 to interconnect toll packet switches 114 and 134 to other packet-switched networks. As a result, each internetwork data link carries only the data packet traffic destined for a particular packet-switched network.

Toll switching systems 120 and 128 are typical stored program-controlled systems such as the 4ESS ™ digital switch, which is manufactured by AT&T Technologies, Inc. This switching system is described in detail in *The Bell System Technical Journal,* Volume 56, Number 7, September, 1977, and Volume 60, No. 6, Part II, July-August, 1981, and need not be fully described herein for the reader to understand the present invention. Toll switching 120 comprises switching network 121, digital interface frame 124, central processor 125, common channel interoffice signaling (CCIS) terminal 126, and miscellaneous equipment units that have not been shown to simplify the drawing. Toll switching system 128 is similarly configured.

Switching network 121 has a time-space-time switching configuration that utilizes time slot interface (TSI) units such as 122 and time multiplex switch (TMS) units such as 123. Access to switching network 121 is via digital interface frame (DIF) 124. The digital interface frame performs time division multiplexing and demultiplexing between switching network 121 and DS-1 type format digital carrier facilities such as 160 and 190. Digital interface frame 124 also processes peripheral control signals from central processor 125 via peripheral bus unit 129.

The majority of the logic, control, storage, and translations functions required for the operation of the toll circuit switching system are performed by central processor 125. A typical central processor suitable for use in the illustrative toll circuit switching system is described in *The Bell System Technical Journal,* Volume 56, Number 2, February, 1977.

Control signaling between the toll circuit switching systems is facilitated by a common channel interoffice signaling (CCIS) system that includes data links separate from the message paths. A typical common channel interoffice signaling system is described in *The Bell System Technical Journal,* Volume 57, Number 2, February, 1978. To simplify the drawing, control signaling between toll circuit switching systems 120 and 128 for the multiplex circuits between toll packet switches 114 and 134 is transmitted on data link 191 that interconnects CCIS terminal 126 in toll circuit switching system 120 and CCIS terminal 127 in toll switching system 128. Interconnecting signaling data links 150 and 161, dynamic circuit allocator 110 provides control signaling between toll packet switch 114 and toll circuit switching system 120. Similarly, dynamic circuit allocator 130 and signaling data links 170 and 181 provide control signaling between toll circuit switching system 128 and toll packet switch 134.

In accordance with this invention, since there is a fixed number of internetwork data links between the circuit-switched network and the toll packet switch of each packet-switched network, a circuit allocator for each packet-switched network repetitively monitors the data packet traffic on each internetwork data link. Circuit allocator 110 monitors the data packet traffic from toll packet switch 114 via data link 151. Similarly, circuit allocator 130 monitors the traffic from toll packet switch 134 via data link 171. As the amount of traffic on the internetwork data links designated for a particular packet-switched network destination changes, the circuit allocator causes the toll packet switch to incrementally change the number of outgoing data links designated for use from the toll packet switch that serve the particular packet switched network destination. The circuit allocator also subsequently causes the circuit switch to correspondingly change the number of channels to the particular destination interconnected with the outgoing links from the packet switch designated for use to the particular destination. Thus, in addition to voice message traffic, the circuits of the toll circuit-switched network of the public switched telecommunications network may be utilized to carry data packet traffic between local packet-switched networks. Furthermore, outgoing data links are utilized on a traffic demand basis to minimize the number of internetwork data links actually required.

Figure 2:
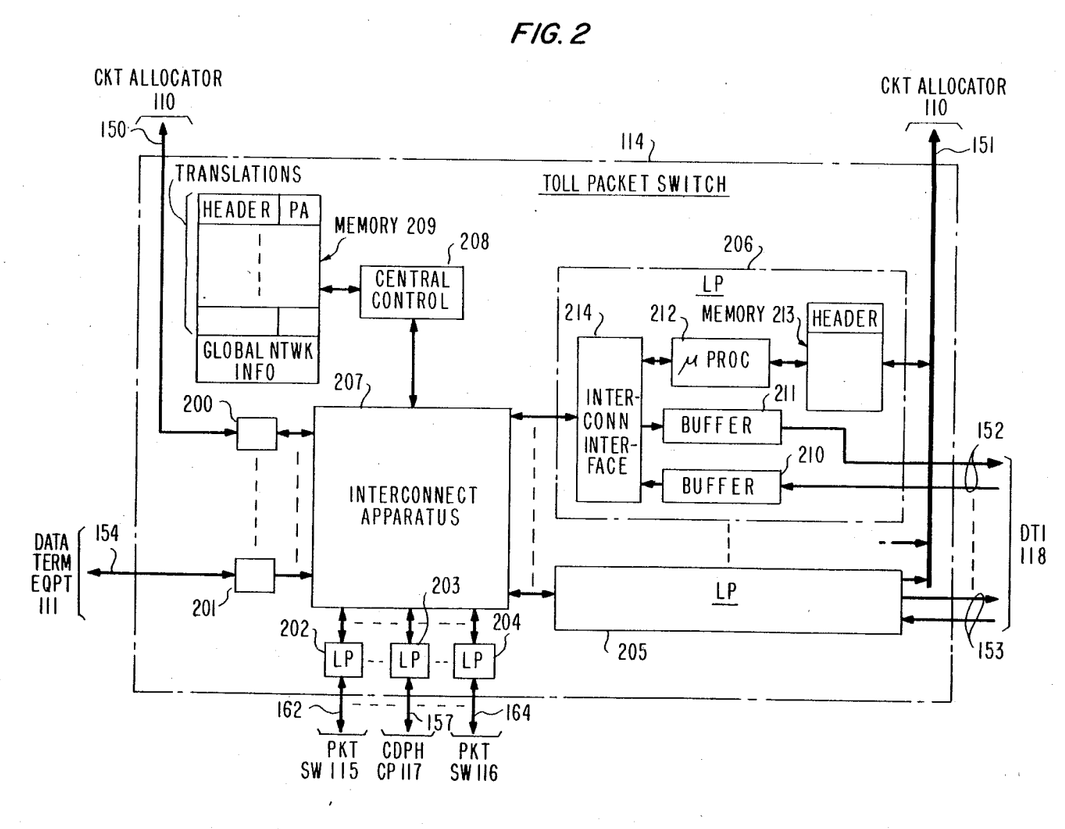
FIG. 2 shows a block diagram of an illustrative toll packet switch included in the local packet-switched networks of FIG. 1.

Depicted in FIG. 2 is a detailed block diagram of toll packet switch 114. This illustrative packet switch comprises a plurality of well-known input-output link processors (LP) such as 200 through 206 interconnected by interconnect apparatus 207. Interconnect apparatus 207 may be configured in any one of a number of well-known configurations such as a bus, ring, star, or matrix. Also included are central control 208 and memory 209. Central control 208 is the central information processing unit of the packet switch. Memory 209 is a memory for storing well-known translations and global network information such as a master routing table.

A data packet from customer equipment such as data terminal equipment 111 includes an X.25 protocol header that identifies the destination. Input-output link processor 201 translates this header destination information and routes it througgh interconnect apparatus 207 to the processor such as 206 associated with the identified destination. Since each internetwork data link carries only the data packets destined for a particular packet-switched network destination, processor 206 accepts only data packets for that particular packet-switched network destination.

In addition to the master routing table in memory 209, limited routing information is also contained within each input-output link processor to route a data packet from one link processor to another through interconnect apparatus 207. When routing information for a particular destination is not provided in the routing information of the link processor, central control 208 retrieves the required routing information from the master routing table and sends it to the requesting input-output link processor. Typically, traffic to infrequently accessed packet-switched networks causes this situation to occur.

The information in the master routing table is repeatedly updated to reflect fluctuations in traffic and network conditions. Traffic and load information is exchanged between the switches of a data packet network via the centralized data packet network control point which is well-known in the art and need not be described herein for the reader to understand the present invention. In addition, toll packet switches 114 and 134 also exchange internetwork conditions and traffic information in a manner similar to that of employed by the CDPN control point.

Furthermore, according to the present invention, internetwork routing information in toll packet switch 114 may be updated via circuit allocator 110, which interfaces packet switch 114 via data link 150. The circuit allocator updates the internetwork routing information in packet switch 114 in a manner similar to that employed by a centralized data packet network control point and will be described in more detail hereinafter.

Each link processor comprises an input and an output buffer memory such as 210 and 211, respectively, in internetwork link processor 206 for queuing data packets. Outgoing data packets remain queued in output buffer memory 211 until they may be transmitted on the output portion of data link 152. Incoming data packets received from the input portion of data link 152 are stored in input buffer memory 210 until link processor control unit 212 translates the X.75 protocol internetwork header destination information to route the data packet through the interconnect apparatus to the indicated link processor and, eventually, the end customer. Routing memory 213 stores the routing information for link processor 206 as well as information to determine the busy/idle condition of the data link. Data packets in input and output buffer memories 210 and 211, as well as routing information in routing memory 213, are exchanged between interconnect apparatus 207 via interconnect interface 214 that employs a well-known contention/arbitration method such as the carrier sense multiple access with collision detection. Circuit allocator 110 accesses routing memory 213 via data link 151 to monitor the busy/idle condition of input and output buffer memories 210 and 211.

Figure 3:
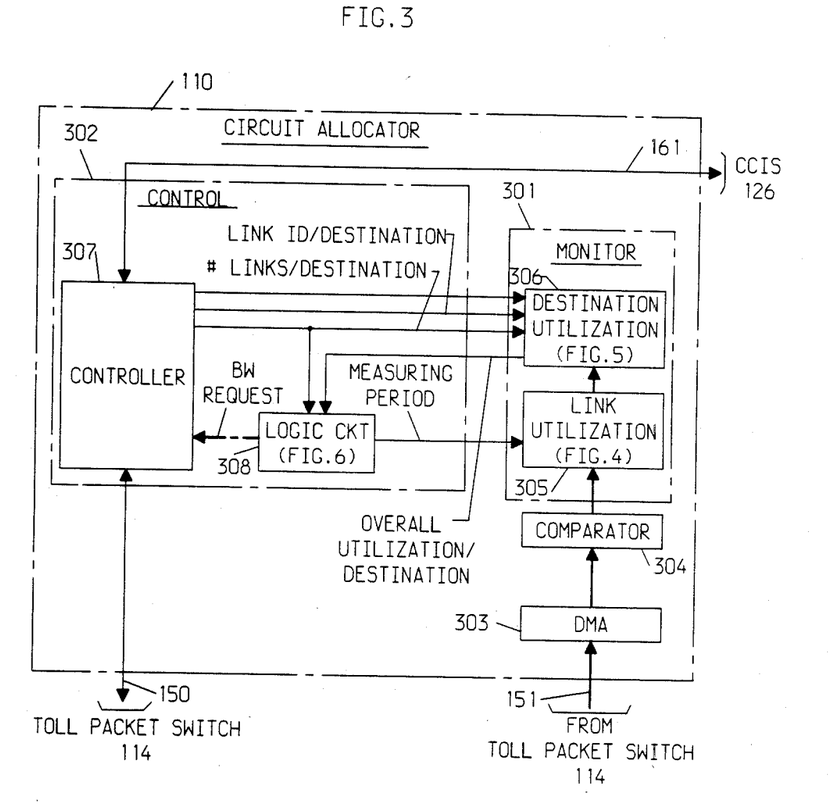
FIG. 3 shows a detailed block diagram of the circuit allocator in FIG. 1.

Depicted in FIG. 3 is a detailed block diagram of circuit allocator 110 that causes toll packet switch 114 to designate certain internetwork data links such as 152 and 153 for exclusive use to a particular destination such as packet-switched network 103. As previously described, the designated internetwork data links and the channels of digital carrier facility 190 are selectively interconnected by circuit switching systems 120 and 128 to form a point-to-point circuit connection between toll packet switches 114 and 134. In anticipation of data packet traffic load changes, the circuit allocator causes toll packet switch 114 and the toll circuit-switched network to incrementally change the number of circuits interconnecting packet switches 114 and 134. This is done to efficiently use the limited number of internetwork data links that interconnect a toll packet switch and the toll circuit-switched network.

The circuit allocator monitors for a predetermined measuring period the data packet activity on each internetwork data link designated for use to a particular destination. Responsive to the busy/idle condition of each internetwork data link, the circuit allocator determines the actual use of each data link or, more particularly, the percent of time that data packets are being transmitted on each data link. The allocator then uses the information from each data link to determine the actual overall use of the data links designated for use to each destination. When the overall use of the data links designated for use to a particular destination reaches either an upper or a lower threshold for a given number of circuits, the allocator sends a control message on link 150 to the packet switch to either increase or decrease the number of internetwork data links designated for use to the particular destination. In response, the toll packet switch updates the routing information to reflect the present number and identity of the outgoing data links designated for use to the particular destination. The packet switch then uses this modified routing information to distribute the data packet traffic for that destination across the changed number of designated internetwork data links for use to the particular destination. The allocator also causes the toll circuit-switched network to selectively connect or disconnect channels of the digital carrier facility to and from the internetwork data links that are designated for use to the particular destination. This is accomplished by the allocator sending well-known CCIS messages to the CCIS terminal in the toll circuit switching system.

Circuit allocator 110 comprises monitor unit 301 and control unit 302. Monitor unit 301 monitors the busy/idle condition of each output internetwork data link to toll circuit switch 120. The busy/idle condition of an output data link indicates the presence or absence of data packets being transmitted on that output data link. Monitor circuit 301 monitors the busy/idle condition for a predetermined measuring period to determine the data packet activity on each output link. A predetermined measuring period is specified for each number of designated output links. The data packet activity may be expressed as a count generated during the measuring period or as a percentage of time data packets are present on a specific output link. The data packet activity from each output link designated for use to a particular destination is combined to derive the actual overall use of the data links designated for use to a particular destination.

Control unit 302 compares the overall activity for each destination presently being served with an upper and a lower activity threshold for the particular number of output links presently designated for use to the particular destination. When the upper activity threshold is exceeded, control unit 302 transmits a signal on link 150 to change the master routing information in toll packet switch 114. This change causes an additional output internetwork data link to be designated for use to the particular destination. When the packet switch returns the identity of the newly designated data link, control unit 302 sends a CCIS request message on link 161 to toll switching system 120 to connect the newly designated internetwork data link to an idle carrier channel to the particular destination, such as an idle channel of carrier facility 190 to toll packet switch 134. In a similar manner, when the overall data packet activity for the particular destination falls below the lower threshold for the number of designated output links, control unit 302 sends a signal to the toll packet switch to change the master routing information to lower the number of output links designated for use to the particular destination. Upon receipt of the dropped data link's identity, control unit 302 sends a CCIS message to the circuit switching system to disconnect the associated carrier facility channel from the dropped output data link.

Also included in the circuit allocator are direct memory access unit 303 and comparator 304. The direct memory access unit comprises a plurality of well-known direct memory access circuits. These circuits read the value of the well-known read and write pointers of the output buffer memory in the routing memory of each link processor. The output buffer memory may be any well-known read/write buffer memory such as a circular type. The value of the read and write pointers of each output buffer memory is then compared by comparator unit 304.

Comparator 304 comprises a plurality of well-known comparator circuits that compare the value of the read and write pointers in each of the link processors. Each circuit is associated with a particular link processor. When the value of the read and write pointers are equal, the associated comparator circuit generates an idle signal that represents the idle condition of the associated output data link. When the value of the read and write pointers are unequal, the associated comparator circuit generates a busy signal that represents the busy condition of the associated output data link.

Responsive to the busy/idle signal for each of the output data links, monitor unit 301 generates a signal that represents the overall use of the data links designated for use to a particular destination. Monitor unit 301 comprises link utilization circuit 305 and destination utilization circuit 306.

Figure 4:
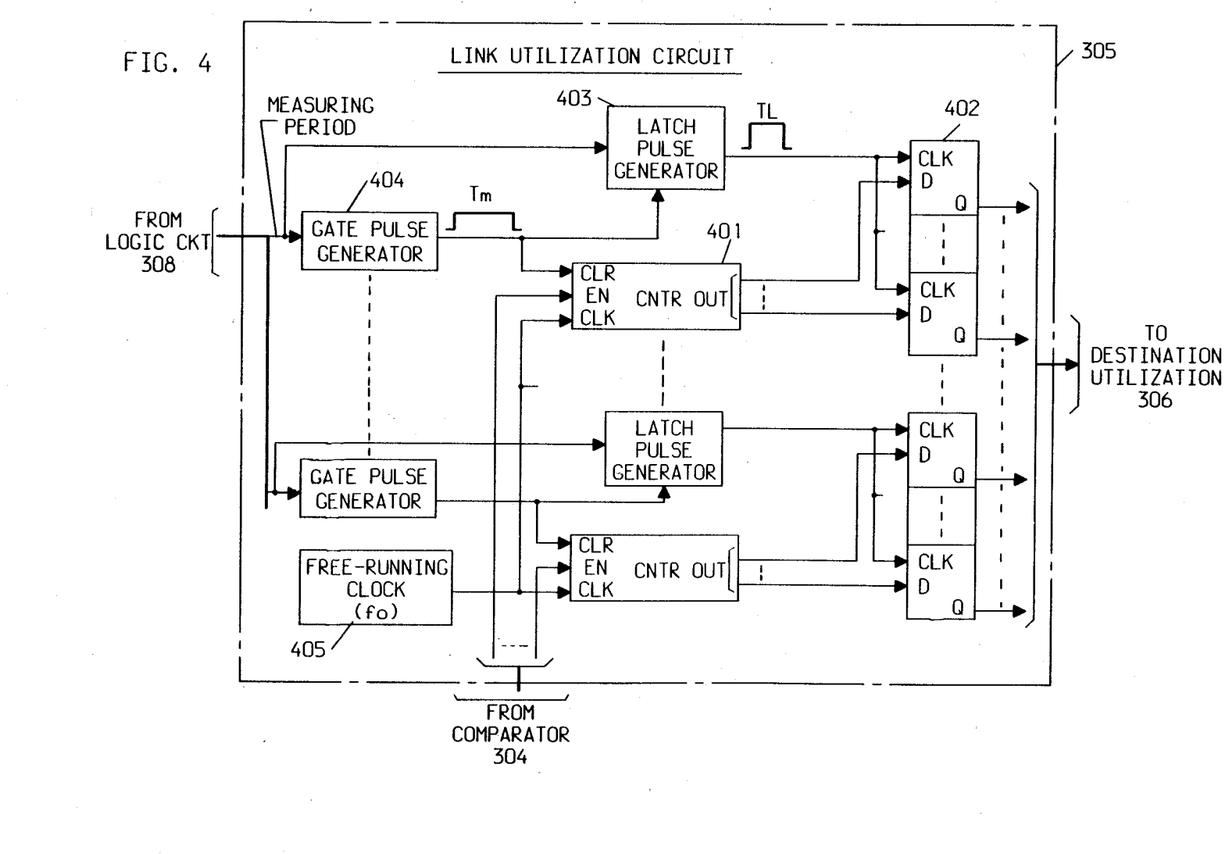
FIG. 4 shows a detailed block diagram of the link utilization circuit of the monitor unit of the circuit allocator in FIG. 3.

Depicted in FIG. 4 is a detailed block diagram of link utilization circuit 305 that comprises a counter such as 401 and a latch unit such as 402 associated with each output data link. Each counter maintains a count that represents the amount of time during a predetermined measuring period that an associated output link is in a busy condition. The count for each measuring period is established by first clearing the individual counters and pulsing the counter with clock pulses from free running clock 405. The duration of the clock pulses are much smaller than the smallest measuring period expected to be encountered and are continuously applied to the clock input terminal of each individual counter.

A well-known variable width gate pulse generator such as 404 for each counter generates a timing signal that has a gate pulse whose duration TM is equal to the predetermined measuring period for the data link. The timing signal at one logic level, such as a low logic level, causes the count contained within each of the individual counter circuits to be zeroed. When the gate pulse occurs, such as when the timing signal assumes a high logic level, the count in each of the individual counter circuits is incremented by each clock pulse when an associated busy signal from comparator 304 is applied to the enable input terminal of the counter. Thus, for each individual counter associated with a particular output data link, the count at the end of the measuring period represents the relative activity on the associated output data link for that measuring period.

Just before the end of the measuring period, a well-known latch pulse generator such as 403 for each counter and latch unit generates a latch pulse to store the counts of each data link in latch unit 402. Each latch unit comprises, for example, a plurality of well-known D-type flip-flops. Each latch unit stores the count associated counter. Thus, the count associated with each output link is stored in an individual latch unit at the end of each measuring period. Latch pulse generator 403 generates the latch pulse in response to the numerical measuring period signal for the data link from logic circuit 308 and the gate pulse from gate pulse generator 404. The trailing edges of the latch and gate pulses occur at approximately the same time. Thus, a utilization count for each output link is stored in an individual latch unit. The utilization count for each of the output data links, along with the measuring period, is applied to destination utilization circuit 306. For each destination, the destination utilization circuit generates a signal representing the actual overall use of the outgoing data links designated for use to a particular destination.

Figure 5:
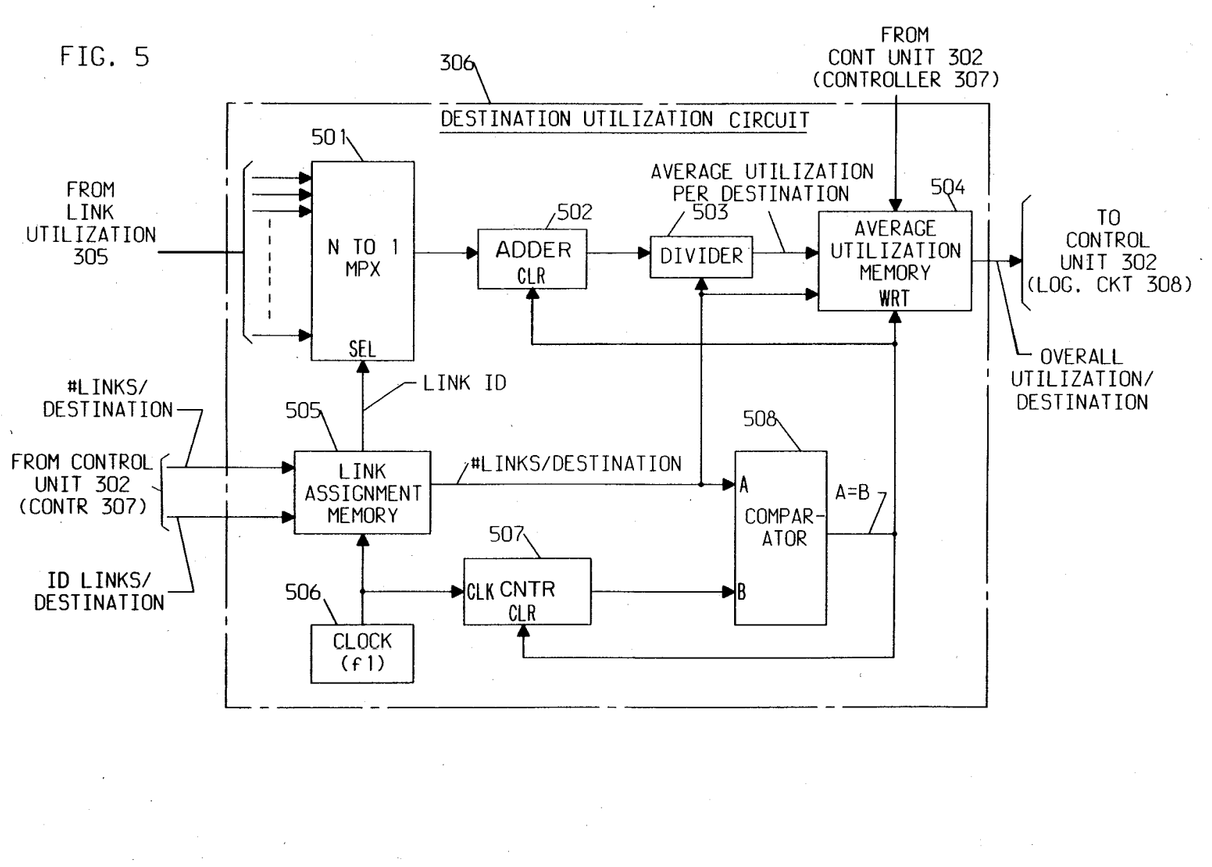
FIG. 5 shows a detailed block diagram of the destination utilization circuit of the monitor unit of the circuit allocator in FIG. 3.

Depicted in FIG. 5 is a block diagram of destination utilization circuit 306. The circuit comprises multiplexer 501 and an arithmetic unit consisting of adder 502 and divider 503 for determining an average utilization count for each of the data links designated for use to a particular destination such as packet-switched network 103. The average utilization count for each destination is stored in average utilization memory 504. Associated with this circuitry is link assignment memory 505 that stores the number and identity of each output data link designated for use to each destination.

The link assignment memory is responsive to control signals from controller 307 for updating the number and identity of output data links designated for use to each destination. For example, in the link assignment memory one line of the memory is dedicated to each packet-switched network having an associated circuit allocator. Thus, for each packet-switched network destination, the number and identity of the internetwork output data links designated for use to that packet-switched network destination is provided. The link assignment memory also comprises a well-known addressing arrangement for addressing each identified output link in response to clock pulses generated by clock 506.

Clock 506 is any well-known clock for generating clock pulses. The frequency, $f_1'$, of these pulses is proportional to the minimum expected measuring period and the total number of output internetwork data links from the toll packet switch. These clock pulses are applied to the addressing arrangement of link assignment memory 505 to sequentially address the utilization count associated with each identified output link.

The identity of each output link designated for use to a particular destination is applied to the input select terminal of multiplexer 501 to multiplex the utilization count associated with the link into adder circuit 502. Thus, the utilization count from each of the output links designated for use to a particular destination are added together by adder circuit 502 to form a total destination count. Divider circuit 503 then divides the total destination count by the total number of output links designated for use to the particular destination to form an overall destination utilization count. The destination utilization count is then stored in destination utilization memory 504. For example, each overall utilization count is stored on a one memory location per destination bases. The number of links designated for use to each destination is stored in link assignment memory 505 and applied to divider circuit 503 and comparator 508. In addition, the clock pulses from clock 506 are applied to the clock input terminal of counter 507 to increment a count contained therein each time the input select terminal of multiplexer 501 is addressed. The present link count and the number of links designated for use to a particular destination are compared by comparator circuit 508. When the two counts are equal, the utilization count for all links designated for use to a particular destination have been added in adder 502, and the destination utilization count is stored in the utilization memory while at the same time clearing adder circuit 502 and counter 507.

The destination utilization count for each destination is read out of utilization memory 504 in response to control signals from processor 307 in control unit 302. In response, memory 504 sends the destination utilization count for a particular destination to logic circuit 308 of control unit 302. Also stored in utilization memory 504 for each destination is the number of links designated to a particular destination, along with the total utilization count for that destination.

Figure 6:
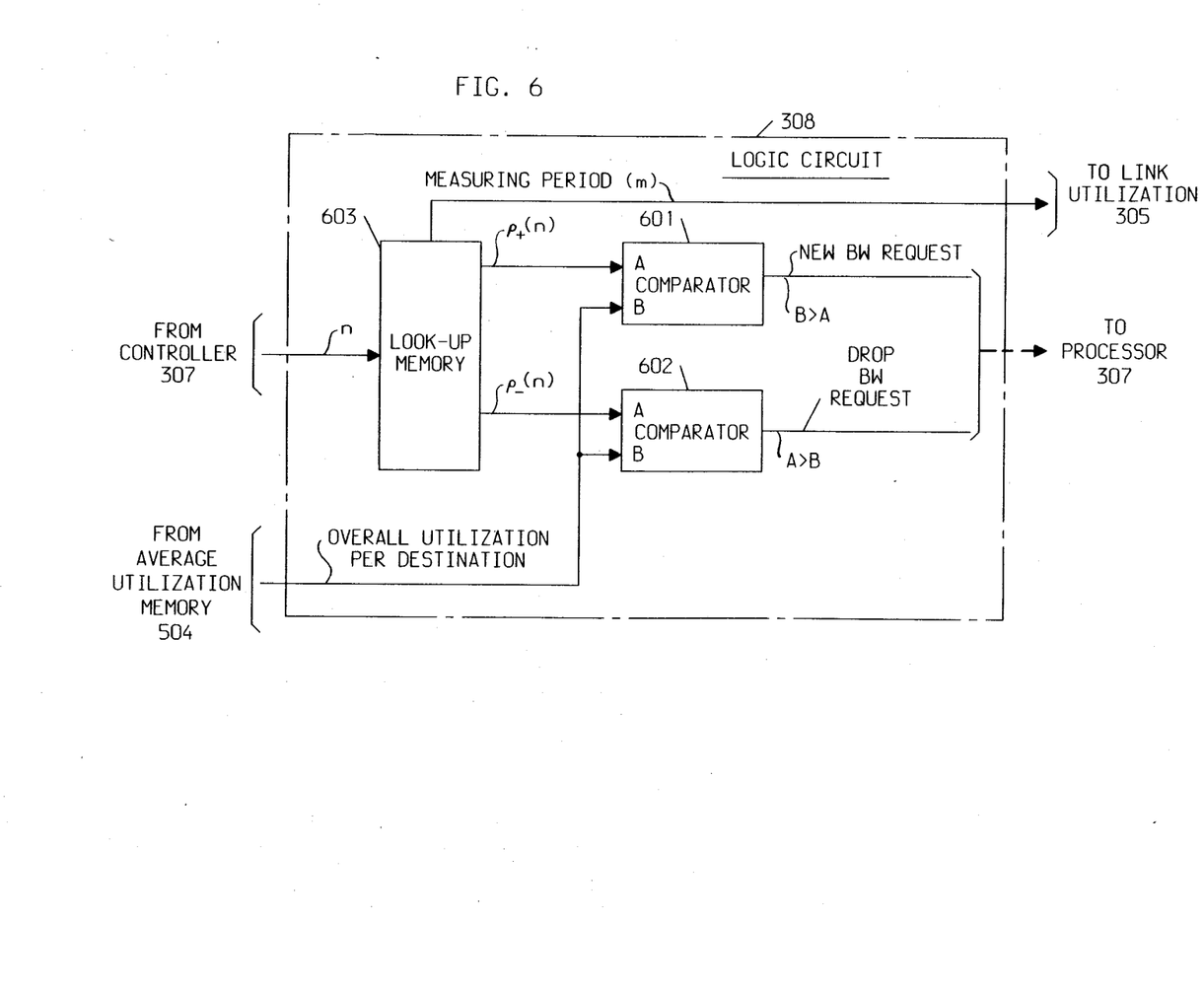
FIG. 6 shows a detailed block diagram of the logic circuit of the control unit of the circuit allocator in FIG. 3.

Depicted in FIG. 6 is a block diagram of logic circuit 308, which comprises comparators 601 and 602 and look-up memory 603. The number of output links (n) designated for use to a particular destination from controller 307 is applied to look-up memory 603 using a table look-up operation to obtain upper and lower utilization threshold counts which are applied to comparator 601 and 602, respectively. Also stored in look-up memory 603 along with upper and lower threshold counts for each number of data links designated for use to a particular destination is an associated measuring period (m) which is sent to link utilization circuit 305 for the next measuring period.

Comparator circuit 601 compares the upper threshold and the total utilization count from memory 504 to generate a signal for requesting that the number of output links designated for use to a particular destination be increased when the total utilization count exceeds the upper threshold count $p_+$. Likewise, comparator circuit 602 compares lower threshold count $p_-$ and the total utilization count to generate a signal for requesting that the total number of output links designated for use to a particular destination be decreased when the total utilization count is less than the lower threshold count. When the total utilization count is between the upper and the lower threshold counts, there are a sufficient number of output data links designated for use to a particular destination, and no request signals are generated. Responsive to these change request signals, controller 307 generates routing control signals to modify the master routing information contained in routing memory 209 of toll packet switch 114. A change in this master routing information will cause the toll packet switch to increase or decrease the number of output links designated for use to a particular destination. When the identity of an added or deleted data link is received from the toll packet switch, controller 307 generates well-known CCIS signals to cause toll circuit switching system 128 to either connect or disconnect the associated carrier facility channel to or from the identified output link.

Controller 307 is a well-known and commercially available unit that may be readily programmed to perform the aforementioned functions.

Figure 7:
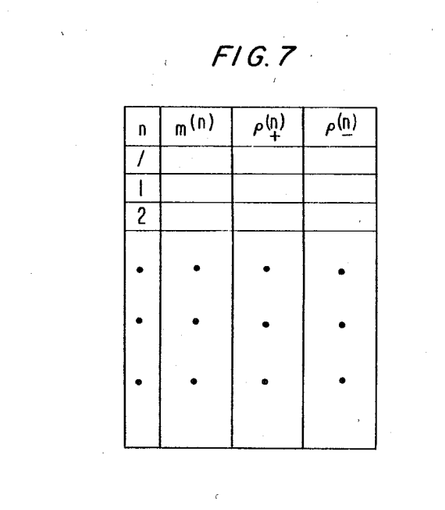
FIG. 7 shows an illustrative tabular memory layout of the look-up memory in the logic circuit of FIG. 6 for storing the upper and lower thresholds for each number of output links designated for use to a particular destination.

In the present embodiment, it is assumed that a data packets destined for packet-switched network 103 arrive at toll packet switch 114 in the form of a continuous time stochastic process $(A(t), t>0)$, where for each fixed time t, $A(t)$ has mean $\lambda(t)$ and standard deviation $\sigma(t)$. Let $\mu(t)$ be the serving capacity from toll packet switches 114 to 134 measured in kilobits per second. In addition, let D in milliseconds be the allowable mean queuing delay experienced by packets at toll packet switch 114. As previously described, the circuit allocator monitors the busy condition of each internetwork output data link channel to a particular destination for measuring period m to form an average utilization per destination or determine the actual overall use of the output links designated for use to each destination. The utilization for each channel may be expressed as the busy time during the measuring period divided by the measuring period or, more specifically, the count for each output link divided by the product of the measuring period and the frequency of free running clock 405. Extending this, the average utilization per destination may be determined by the sum of all the individual channel utilizations divided by the number of channels. When average destination utilization $\rho$ is between the upper and lower thresholds $\rho_+$ and $\rho_-$, the number of output data links designated for use to a particular destination is sufficient. When destination utilization $\rho$ is greater than upper threshold $\rho_+$, additional capacity and output data links are required. Similarly, reduction of excess capacity is requested when destination utilization $\rho$ is less than the lower threshold $\rho_-$. In any case, whenever serving capacity $\mu(t)$, which is represented by n internetwork output data links channels to a particular destination, changes, a new measuring period, m and upper and lower thresholds $\rho_+$ and $\rho_-$ are used. The measuring period m and upper and lower thresholds $\rho_+$ and $\rho_-$ are stored in look-up memory 603 in a tabular form, as depicted in FIG. 7, for each number n of output data link channels to a particular destination.

The upper and lower threshold utilizations $\rho_+{}^{(n)}$ and $\rho_-{}^{(n)}$, as well as measuring period $m^{(n)}$ for n output data link channels designated for use to a particular destination, may be determined using a mathematical formula having four global parameters: D, $\lambda'$, G, and K. Mean packet delay D in milliseconds represents the maximum average cross-network packet delay that a data packet will experience in transmission from one customer to another, such as from data terminal equipment 111 to data terminal equipment 131. Well-known for each data packet-switched network, mean packet delay D commonly does not exceed 300 milliseconds and, in queuing theory terminology, represents the sum of the service time and the waiting time. The maximum rate of increase in mean packet traffic $\lambda'$, in packets per second per second is a well-known characteristic of the particular data packet switch. In practice, this upper bound can be approximated by saturating the packet switch and measuring the rate of saturation. Minimum bandwidth granularity G represents the minimum incremental amount of capacity, such as 56 or 64 Kbps, associated with an output data link that may be added to or deleted from the total capacity designated for use to a particular destination. Mean circuit setup time K is the amount of time, in seconds, needed to add incremental capacity G to a particular destination, and is well-known in the art for a particular circuit switch. The variable n represents the number of channels or, more specifically, internetwork output data links presently designated for use to a particular destination.

Figure 8:
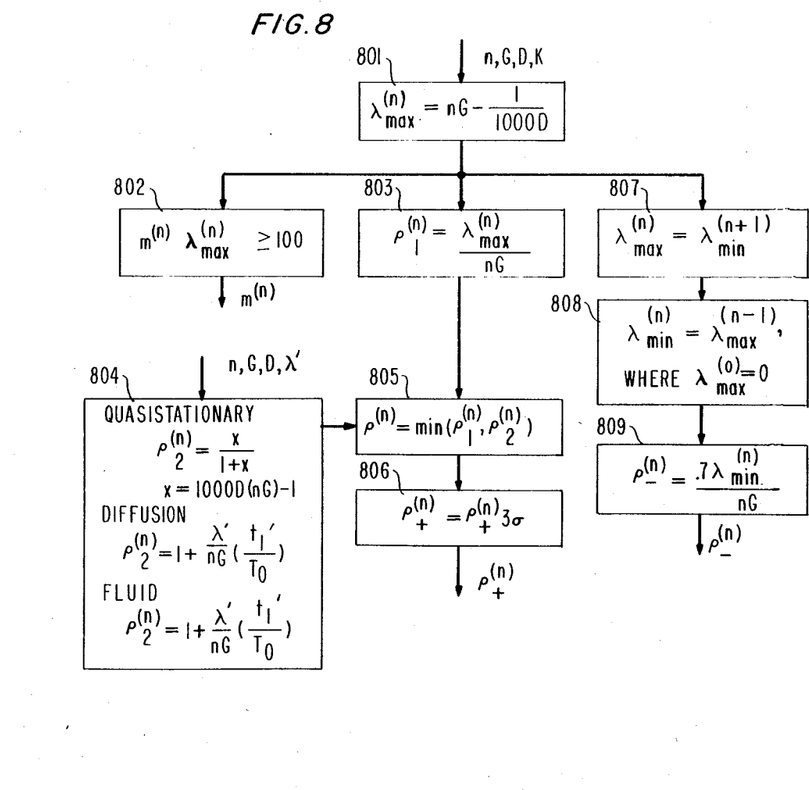
FIG. 8 depicts a flow diagram for determining the measuring period and the upper and lower thresholds for each number of output links designated for a particular destination.

Depicted in FIG. 8 is a flow diagram for calculating the measuring period $m^{(n)}$ and the upper and lower threshold utilizations $\rho_+^{(n)}$ and $\rho_-^{(n)}$ for each number n of channels designated for use to a particular destination using global parameters G, D, $\lambda'$, and K. For each number n of internetwork output data link channels designated for use to a particular destination, the measuring period and upper and lower threshold utilizations may be calculated using the formulas in the flow diagram of FIG. 8. As shown in block 801, the maximum steady state Poisson input mean $\lambda_{max}^{(n)}$ for a given mean packet delay D and granularity G may be calculated where:

$$\lambda_{max}^{(n)} = nG - \frac{1}{1000D}.$$

The maximum steady state Poisson input mean is calculated under the assumption of a well-known M/M/1 queue and is obtained by a simple transformation of the well-known formula $T = (1/\mu)/(1-\rho)$ found on page 98 in Vol. I of L. Kleinrock's work entitled *Queuing Systems*, John Wiley & Sons, 1975.

With the maximum steady state Poisson input mean $\lambda_{max}^{(n)}$, let the measuring period $m^{(n)}$ be the smallest integer such that $m^{(n)}\lambda_{max}^{(n)} \geq 100$, as shown in block 802. This value is chosen because the rate of approximately 100 packets per period of m seconds is sufficient to guarantee that the sample distribution will be close to a normal distribution. In addition, the maximum steady state utilization $\rho_1^{(n)}$ may be determined by the expression $$\rho_1^{(n)} = \lambda_{max}^{(n)}/nG,$$

as shown in block 803.

The rush hour behavior of a queuing system may be used to determine the maximum transient utilization $\rho_2^{(n)}$, such that during a K second period of circuit allocation, the mean packet delay D will not be exceeded. This well-known behavior may be found in the work of G. F. Newell entitled *Applications of Queuing Theory*, Chapman & Hall, Ltd., London, 1971. According to the Newell work, the rush hour behavior of a queuing system can be approximated by the function $F(x', t')$, which satisfies the following differential equation:

$$\frac{\partial F(x',t')}{\partial t'} = -t'\frac{\partial F(x',t')}{\partial x'} + \tfrac{1}{2}\frac{\partial^2 F(x',t')}{(\partial x')^2},$$

where $x' = x/L_0$ and $t' = t/T_0$. In the above equation, x equals queue length, and t equals time in seconds, where $t=0$ corresponds to utilization $\rho(t)=1$. Here, utilization $\rho(t)$ is always increasing, and $\rho'(o)=\infty$. Since nG is fixed during the rush hour period, it may be assumed that $\alpha = \lambda'/nG'$ where $\lambda'$ is a global parameter. The above differential equation does not have a simple analytical solution, therefore a numerical table must be prepared. This is a relatively straightforward task, and tables to any desired degree of accuracy may be prepared.

Figure 9:
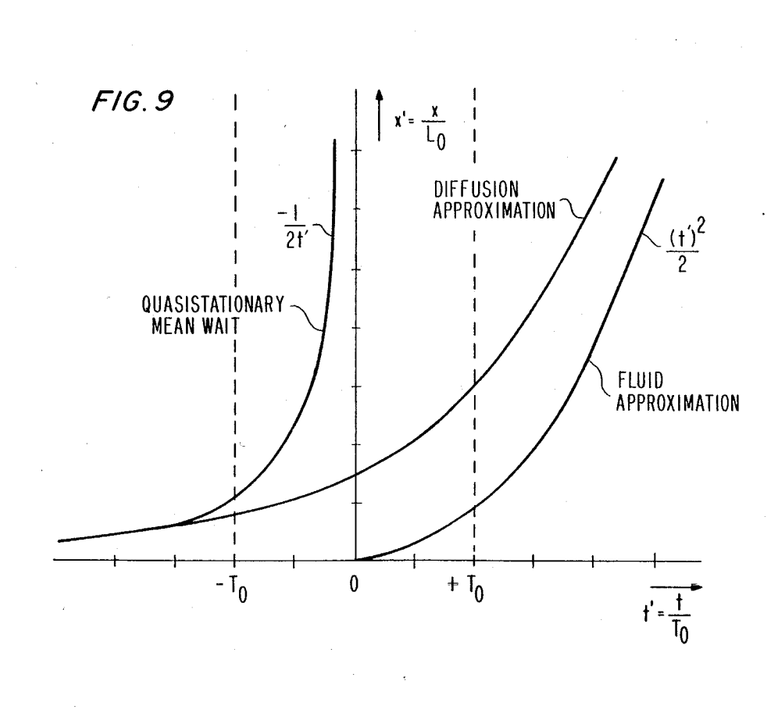
FIG. 9 graphically depicts the rush hour behavior of a queueing system represented by three different approximations.

Depicted in FIG. 9 is the solution to the above partial differential equation represented by three different approximations: the fluid, diffusion, and quasistationary mean wait models.

Since the function $F(x', t')$ is monotone, the inverse function F' also exists, and solutions to it may also be prepared in table form. To use these tables, coordinates must be changed and are given by the expressions $$t' = \frac{t}{T_0}, \; x' = \frac{x}{L_0} \text{ where } T_0 = \frac{\Delta(t)^{\frac{1}{3}}}{(nG)^{\frac{2}{3}}\alpha^{\frac{2}{3}}}, \; L_0 = \frac{\Delta(t)^{\frac{2}{3}}}{(nG)^{\frac{1}{3}}\alpha^{\frac{1}{3}}}.$$

In these above expressions, $\Delta(t) = \lambda(t) + \mu(t)$ for exponentially distributed service and interarrival times. Since the capacity $\mu$ is nG and it is constant throughout and $\lambda(t) = \mu(t)$ at $t=0$, we can assume that $\Delta(t) = 2nG$. Thus, the two normalization constants $T_0$ and $L_0$ may be expressed as:

$$T_0 = \frac{(2nG)^{\frac{1}{3}}}{\lambda'^{\frac{2}{3}}} \; L_0 = \frac{(2nG)^{\frac{2}{3}}}{\lambda'^{\frac{1}{3}}}.$$

From these normalization constants $T_0$ and $L_0$, normalized queue length x' for a given normalized time t' may be approximated using one of the three approximation models depicted in FIG. 9. From the rush hour behavior of a queuing system as described in the Newell work, t' may be determined where $x' = x/L_0$ and $x = 1000D(nG) - 1$.

Thus, maximum transient utilization $\rho_2^{(n)}$ may be determined. First, the delay time 1000D seconds is changed to an acceptable mean queue length x where: $x = 1000D(nG) - 1$. Next, calculate $x' = x/L_0$ and $(K+m)' = t/T_0$. From here, find $F^{-1}(x') = t'$ from the tables, and let $t'_1 = t' - (K+m)'$.

Having $t'_1$, maximum transient utilization $\rho_2^{(n)}$ may be determined using one of three relationships, depending on the value of $t'_1$ with respect to $T_0$. When $T_0 \geq t'_1 \geq -T_0$, the assumption that $\rho'(t) = \lambda'/(nG)$ holds, and transient utilization $\rho_2^{(n)}$ may be determined using the following expression for the diffusion model:

$$\rho_2^{(n)} = 1 + (\lambda_n G')(t'_1 T_0')$$

as shown in block 804. When $t'_1 > -T_0$, the system is in quasi-equilibrium, and it closely approximates the M/M/1 queue. In that case, find $x_1' = F(t_1')$ from the tables, and then calculate $x = x_1' T_0$. Thus, the transient utilization $\rho_2^{(n)}$ may be expressed as $x/(1+x)$. In the third case, when $t'_1 > T_0$, then $\rho'(t) < \lambda'/nG$ and the transient utilization may be expressed as:

$$1 + \left(\frac{\lambda'}{nG}\right)\left(\frac{t'_1}{T_0}\right),$$

which is always an acceptable bound.

Thus, the maximum transient utilization $\rho_2^{(n)}$ may be considered the allocation threshold necessary to guarantee that during the period of circuit allocation of duration K seconds, the mean packet delay D requirement will not be exceeded. From the steady and transient utilizations $\rho_1^{(n)}$ and $\rho_2^{(n)}$, the maximum theoretical input mean $\rho^{(n)}$ that can be handled by allocation nG during the steady state, as well as the rush period, may be expressed by the minimum of $\rho_1^{(n)}$ and $\rho_2^{(n)}$ as shown in block 805. Note that $\rho_1^{(n)} \leq \rho_2^{(n)}$ implies that the maximum rate of increase of the input mean $\lambda'$ is sufficiently small for the system to change so slowly from steady state to steady state that the rush hour effect is negligible. On the other hand, $\rho_2^{(n)} < \rho_1^{(n)}$ indicates that additional allowances have to be made to meet rush period requirements and that the system will not be allowed to reach $\rho_1^{(n)}$.

Thus, the upper threshold utilization $\rho_+^{(n)}$ may be found three standard deviations $\sigma$ above $\rho^{(n)}$, as shown in block 806. The maximum steady state Poisson input mean $\lambda_{max}^{(n)}$ may also be used to calculate the lower threshold utilization $\rho^{(n)}$, as depicted in blocks 807 through 809, by letting $\lambda_{min}^{(n)} = \lambda_{max}^{(n-1)}$, assuming that $\lambda_{max}^{(0)} = 0$. The lower threshold utilization $\rho_-^{(n)}$, as depicted in block 809 is represented by the expression: $\rho_-^{(n)} = 0.7 \lambda_{min}^{(n)}/nG$. Thus, an allocation of nG kilobits per second can handle any input mean that falls within the interval $(\lambda_{min}^{(n)}, \lambda_{max}^{(n)})$. In addition, this guarantees that the decision for a reduction in bandwidth is made with approximately 0.999 certainty. Note that even though the sample period was chosen such that $m^{(n)}\lambda_{max}^{(n)}$ approximates 100, the approximation for the lower threshold utilization is sufficient for practical purposes for $\lambda_{min}^{(n)}$. If additional accuracy is required, a second decision period may be implemented.

The measuring period $m^{(n)}$ and the upper and lower utilization thresholds $\rho_+^{(n)}$ and $\rho_-^{(n)}$ are calculated for each number n of internetwork output data link channels to a particular destination and stored in look-up memory 603 in a tabular form as suggested in FIG. 7. Assuming a number n of internetwork output data link channels are designated for use to a particular destination with a bandwidth of nG Kbps, the actual utilization $\rho$ is determined every $m^{(n)}$ second measuring period. When the actual utilization $\rho$ falls between the upper and lower utilization thresholds $\rho_+^{(n)}$ and $\rho_-^{(n)}$, respectively, the present number of internetwork channels to the particular destination are sufficient to handle the data packet traffic therebetween. When the actual utilization exceeds the upper utilization $\rho_+^{(n)}$, the data packet traffic has increased to a level where the present number of internetwork channels are insufficient to accommodate the load while still satisfying the delay requirement.

The circuit allocator then requests the toll packet switch to increase the number of data links designated for use to the particular destination. When a data link is available, the packet switch will designate the data link for use to the particular destination and will send the identity of the data link back to the circuit allocator. Upon receipt of the identity of the newly designated data link, the circuit allocator requests the circuit switching system to connect a transmission facility channel to the identified data link. Thus an additional point-to-point circuit connection to the particular destination is provided to handle the increased data packet traffic.

On the other hand, when the data packet traffic to a particular destination subsides such that the actual utilization drops below the lower utilization levels $\rho_-^{(n)}$, a data link designated for use to the particular destination may be released. The circuit requests the toll packet switch and circuit switching system to disconnect the circuit connection to the particular destination. As the number of data link channels n is either increased or decreased, the circuit allocator uses a new measuring period, $m^{(n)}$, and a new set of threshold levels ($\rho_+^{(n)}$, $\rho_-^{(n)}$) from look-up memory 603 to compare the actual utilization with.

What is claimed is:

1. An arrangement for routing data packets through a circuit switch; comprising:
    a packet switch having a plurality of output links connected to said circuit switch and memory means for storing the identity of said output links designated for use to a particular destination;
    said circuit switch having a plurality of channels to said particular destination and means for interconnecting said designated output links with a number of said channels equal to the number of said output links designated for use to said particular destination; and
    allocator means responsive to data packets on said designated output links for causing said packet switch to change the number of said output links designated for use to said particular destination when the overall use of said designated output links reaches a threshold.

2. The arrangement in accordance with claim 1 in which said allocator means comprises control means responsive to the change in the identity of said output links designated for use to said particular destination for causing said circuit switch to change the number of said channels interconnecting with said output links designated for use to said particular destination.

3. The arrangement in accordance with claim 1 in which said allocator means comprises:
    monitor means responsive to the busy/idle condition of each of said designated output links for determining the overall use of said designated output links and
    control means for causing said packet switch to change the number of said output links designated for use to said particular destination when the overall use of said designated output links reaches said threshold.

4. The arrangement in accordance with claim 3 in which said monitor means comprises link utilization means responsive to the busy/idle condition of each of said designated output links for ascertaining the individual use of each of said designated output links and
    destination utilization means responsive to the individual use of each of said designated output links for ascertaining the overall use of said designated output link.

5. The arrangement in accordance with claim 4 in which said link utilization means comprises:
   counter means responsive to the busy/idle condition of each of said designated output links for changing an individual count contained therein for each of said designated output links and representative of the individual use of each of said designated output links and
   latch means for storing the individual count representative of the individual use of each of said designated output links.

6. The arrangement in accordance with claim 4 in which said destination utilization means comprises:
   arithmetic means responsive to the individual use of each of said designated output links for determining the overall use of said designated output links and
   memory means for storing the overall use of said designated output links.

7. The arrangement in accordance with claim 3 in which said control means comprises
   logic means responsive to the number of said output links designated for use to said particular destination for comparing said threshold and the overall use of said designated output links and
   controller means for causing said packet switch to change the number of said output links designated for use to said particular destination when the overall use of said designated output links reaches said threshold.

8. The arrangement in accordance with claim 7 in which said logic means comprises:
   memory means for storing said threshold level for the number of said output links designated for use to said particular destination and
   comparator means for comparing said threshold and the overall use of said designated output links.

9. An arrangement for routing data packets through a circuit switch; comprising:
   a packet switch having a plurality of output links coupled to said circuit switch and memory means for storing the identity of said output links designated for use to a particular destination;
   said circuit switch having a plurality of channels to said particular destination and means for interconnecting said designated output links with a number of said channels equal to the number of said output links designated for use to said particular destination; and
   allocator means for causing said packet switch to increase the number of said output links designated for use to said particular destination when the overall use of said designated output links is greater than a first threshold and to decrease the number of said output links designated for use to said particular destination when the overall use of said designated output links is less than a second threshold.

10. The arrangement in accordance with claim 9 in which allocator means comprises control means responsive to the increase in the number of said output links designated for use to said particular destination for causing said circuit switch to correspondingly increase the number of said channels interconnecting with said output links designated for use to said particular destination and wherein said control means is also responsive to the decrease in the number of said output links designated for use to said particular destination for causing said circuit switch to correspondingly decrease the number of said channels interconnecting with said output links designated for use to said particular destination.

11. The arrangement in accordance with claim 9 in which said allocator means comprises:
   monitor means responsive to the busy/idle condition of each of said designated output links for determining the overall use of said designated output links and
   control means for causing said packet switch to increase the number of said output links designated for use to said particular destination when the overall use of said designated output links is greater than said first threshold and to decrease the number of said output links designated for use to said particular destination when the overall use of said designated output links is less than said second threshold.

12. The arrangement in accordance with claim 11 in which said monitor means comprises link utilization means responsive to the busy/idle condition of each of said designated output links for ascertaining the individual use of each of said designated output links and
   destination utilization means responsive to the individual use of each of said designated output links for ascertaining the overall use of said designated output links.

13. The arrangement in accordance with claim 12 in which said link utilization means comprises:
   counter means responsive to the busy/idle condition of each of said designated output links for changing an individual count contained therein for each of said designated output links and representative of the individual use of each of said designated output links and
   latch means for storing the individual count representative of the individual use of each of said designated output links.

14. The arrangement in accordance with claim 11 in which said destination utilization means comprises:
   arithmetic means responsive to the individual use of each of said designated output links for determining the overall use of said designated output links and
   memory means for storing the overall use of said designated output links.

15. The arrangement in accordance with claim 11 in which said control means comprises:
   logic means responsive to the number of output links designated for use to said particular destination for comparing the overall use of said designated output links with said first and second thresholds and
   controller means for causing said packet switch to increase the number of said output links designated for use to said particular destination when the overall use of said designated output links is greater than said first threshold and to decrease the number of said output links designated for use to said particular destination when the overall use of said designated output links is less than said second threshold.

16. The arrangement in accordance with claim 15 in which said logic means comprises:
   first comparator means for comparing the overall use of said designated output links with said first threshold and second comparator means for comparing the overall use of said designated output links with said second threshold.

17. The arrangement in accordance with claim 15 in which said logic means comprises memory means for storing said first and second thresholds for the number of said output links designated for use to said particular destination;
    memory means for storing third and fourth thresholds for the increased number of said output links designated for use to said particular destination; and
    memory means for storing fifth and sixth thresholds for the decreased number of said output links designated for use to said particular destination.

18. The arrangement in accordance with claim 17 wherein said first, third, and fifth thresholds $\rho_+^{(n)} = \rho^{(n)} + 3\sigma$ for the number n of said output links designated for use to said particular destination; such that the maximum theoretical input mean
    $\rho^{(n)} = \min$;
    where the maximum steady state utilization
    $\rho_1^{(n)} = 1 - 1/1000D(nG)$;
    the maximum transient utilization
    $\rho_2^{(n)} \leq 1 - 1/1000D(nG)$, when $t_1' < -T_0$;
    the maximum transient utilization
    $\rho_2^{(n)} - 1 + (\lambda'/nG)(t_1'/T_0)$, where $T_0 = (2nG)^{\frac{1}{2}}/(\lambda')^{\frac{1}{2}}$, when $t_1' \geq -T_0$; and where
    $\sigma$ = a standard deviation,
    D = the mean delay of data packets to said particular destination,
    G = the minimum bandwidth granularity of said designated output links,
    $\lambda'$ = the maximum rate of increase in the input mean of data packets designated for said particular destination; and
    $t_1'$ = time.

19. The arrangement in accordance with claim 17 wherein said second, fourth, and sixth thresholds $\rho_-^{(n)} = 0.7 \lambda_{min}^{(n)}$ for the number n of said output links designated for use to said particular destination, such that
    $\lambda_{min}^{(n)} = \lambda_{max}^{(n-1)}$, where $\lambda_{max}^{(0)} = 0$;
    $\lambda_{max}^{(n)} = \lambda_{min}^{(n+1)}$; and
    $\lambda_{max}^{(n)} = nG - 1/1000D$, where
    D = the mean delay of data packets to said particular destination; and
    G = the minimum bandwidth granularity of each of said designated output links.

20. For use with a packet switch and a circuit switch, said packet switch having a plurality of output links connected to said circuit switch and memory means for storing the identity of said output links designated for use to a particular destination, said circuit switch having a plurality of channels to said particular destination and means for interconnecting said designated output links with a number of said channels equal to the number of said output links designated for use to said particular destination, an allocation arrangement for causing the packet switch to change the number of output links designated for use to a particular destination dependent on the overall use of the designated output links comprising:
    monitor means responsive to the busy/idle condition of each of said designated output links for determining the overall use of said designated output links and
    control means for causing said packet switch to change the number of said output links designated for use to said particular destination when the overall use of said designated output links reaches a threshold.

21. For use with a packet switch and a circuit switch, said packet switch having a plurality of output links connected to said circuit switch and memory means for storing the identity of said output links designated for use to a particular destination, said circuit switch having a plurality of channels to said particular destination and means for interconnecting said output links designated for use to said particular destination with a number of said channels equal to the number of said output links designated for use to said particular destination, an allocation arrangement for causing the packet switch to change the number of output links designated for use to a particular destination dependent on the overall use of the designated output links comprising:
    monitor means responsive to the busy/idle condition of each of said designated output links for determining the overall use of said designated output links and
    control means for causing said packet switch to increase the number of said output links designated for use to said particular destination when the overall use of said designated output links is greater than a first threshold and to decrease the number of said output links designated for use to said particular destination when the overall use of said designated output links is less than a second threshold.

* * * * *

UNITED STATES PATENT AND TRADEMARK OFFICE
CERTIFICATE OF CORRECTION

PATENT NO. : 4,556,972

DATED : December 3, 1985

INVENTOR(S) : Dominic K. Chan, Kwok P. Lee, Ronald B. Martin

It is certified that error appears in the above-identified patent and that said Letters Patent is hereby corrected as shown below:

In the Abstract, lines 21 through 24, should read as follows:

The number of output links designated for use to the particular destination is similarly decreased when the designated overall use of the designated output links falls below a lower threshold.

Signed and Sealed this

Sixth Day of May 1986

[SEAL]

Attest:

DONALD J. QUIGG

Attesting Officer

Commissioner of Patents and Trademarks